March 18, 1924.
I. W. RIBYAT
CRIB FOR AUTOMOBILES
Filed Sept. 27, 1922
1,487,475
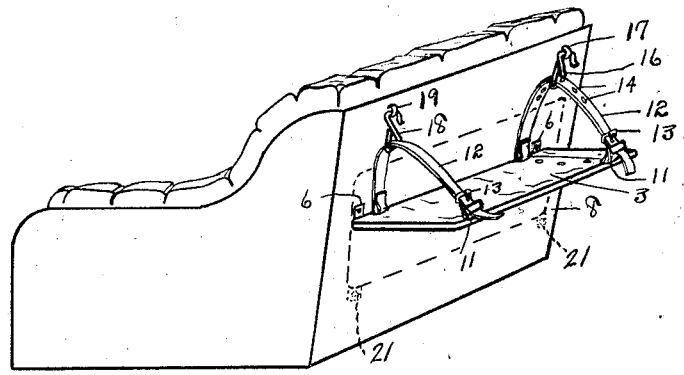
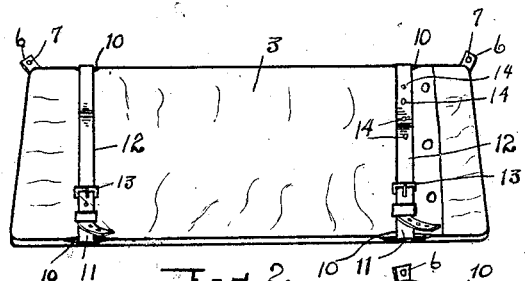
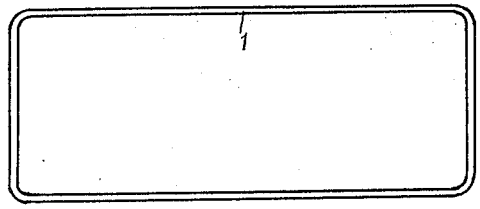
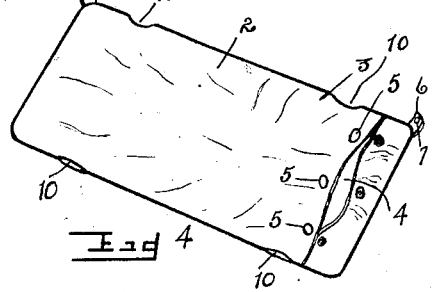
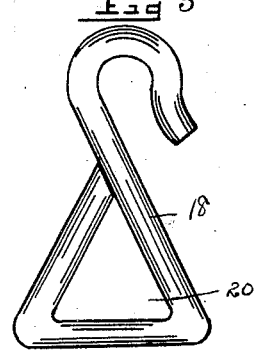
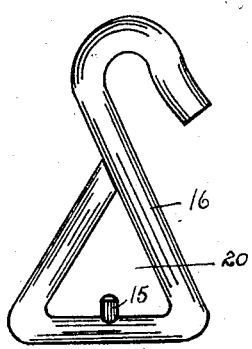
INVENTOR
Ike W. Ribyat
BY Thomas L. Wilder
ATTORNEY Patented Mar. 18, 1924.

1,487,475

UNITED STATES PATENT OFFICE.

IKE W. RIBYAT, OF SYRACUSE, NEW YORK.

CRIB FOR AUTOMOBILES.

Application filed September 27, 1922. Serial No. 590,772.

*To all whom it may concern:*

Be it known that I, IKE W. RIBYAT, a citizen of the United States, residing at Syracuse, in the county of Onondaga and State of New York, have invented certain new and useful Improvements in Cribs for Automobiles, of which the following is a specification, reference being had therein to the accompanying drawing.

My invention relates to a crib for automobiles, and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a crib that can be attached to the back wall of the seat of an automobile in such manner that it can be readily pushed back to lie parallel to said wall, where it will occupy little space and be out of the way when not in use. Moreover, the crib can be pushed to the right or left on its hangers, whereby to give more or less space for persons entering the automobile or it can be rocked to quiet a crying baby that may be occupying the crib. Furthermore, the crib can be detached easily from its hangers, whereby to carry the baby resting therein to and from the house to the automobile without disturbing the repose of the baby.

The fabric covering the frame and forming the resting surface of the crib is made removable from said frame, whereby it can be detached readily for cleaning and airing purposes. This feature renders the device perfectly sanitary.

The frame itself is made very light, whereby the crib is easily portable, so that no difficulty will be experienced in carrying the crib about from place to place. Moreover the crib is suspended from its hangers in such manner that it can be raised or lowered easily to suit the desires of the user.

The crib can be used for a child that has outgrown its dimensions by pushing the mattress carried thereon longitudinally outward and by placing a pillow under the head portion.

Although, I have stated the device as applied to automobiles, it can be hung on the head part of an ordinary bed for household use.

The object will be understood by referring to the drawings in which:

Fig. 1 is a perspective view of the crib, showing the same mounted to the back wall of the seat of an automobile that is illustrated in fragment;

Fig. 2 is an enlarged perspective view of the crib;

Fig. 3 is an enlarged plan view of the metal frame used;

Fig. 4 is a perspective view of the fabric covering for the frame, but that is employed;

Fig. 5 is a detail enlarged view of a hook used;

Fig. 6 is a detail enlarged view of another hook used.

Referring more particularly to the drawings, the crib embodies a frame 1 of a light metal preferably a rod bent into rectangular form with the corners slightly curved. The frame is covered with a fabric 2 that is sewed or hemmed in the shape of a bag 3 having an opening 4 adjacent one end thereof, whereby the bag 3 can be drawn over frame 1. Opening 4 extends clear across the uper flap of bag 3 in a transverse manner and is closed by glove fastener buttons 5, 5, 5, the complementary parts of which are secured to the respective free edges along the opening 4 of bag 3.

Bag 3 is equipped with tags 6, 6 secured adjacent two of the corners thereof and having attached glove fastener buttons 7 adapted to engage their respective counterparts mounted to the back wall 8 of the front seat of the automobile, whereby to aid in holding the frame either in horizontal position, when in use, or in vertical position, when not in use.

Openings 10, 10 are made in bag 3 for the insertion of the ends of each pair of straps 11 and 12, which ends are secured about frame 1. The free ends of each pair of straps 11 and 12 are fastened together by the ordinary well known buckles 13, whereby straps 11 and 12 can be lengthened or shortened with respect to each other to lower or raise the crib relative to the floor of the automobile.

Moreover, one of the straps 12 is equipped with adjustable apertures 14 adapted to severally engage a tooth 15 formed integral with the hook 16. Hook 16 is adapted to engage, in turn, an eye 17 mounted to the back wall 8 of the seat of the automobile.

The engagement of tooth 15 with one of the several apertures 14 will insure the horizontal position of the crib in accordance with the degree of adjustment of each pair of straps 11 and 12. Hook 18 is employed to hold the other pair of straps 11 and 12 to eye 19 fastened to wall 8. It is made without such a tooth as 15.

The crib is hung in position on the back wall 8 of the front seat of an automobile by first projecting straps 11 and 12 of each pair through the lower triangular shaped openings 20 formed in each of the hooks 16 and 18 respectively and then buckling the free ends of each pair of straps 11 and 12 together. Hooks 16 and 18 are engaged then with eyes 17 and 19. Tags 6 are secured also by means of the glove fastener buttons 7 to wall 8, whereby to aid in holding frame 1 in horizontal position. This horizontal position of frame 1 can be altered, however, to suit the desires of the user by adjusting the free ends of straps 11 and 12, in each instance.

In the event that the crib is not needed for holding a child or for any other purpose, it can be moved quickly out of the way by disengaging tags 6 and by grasping the near side of frame 1 and by swinging said frame into the dotted line position illustrated in Fig. 1. Buttons 7 of tags 6 can be secured to their counterparts 21, 21 attached also to wall 8, whereby to aid in holding frame 1 in dotted line position. In moving frame 1 from horizontal to vertical position, the one strap 12 will be moved to disengage its aperture 14 from tooth 15. When this is done, both pairs of straps 11 and 12 will slide easily through the triangular shaped openings 20 formed in hooks 16 and 18. Frame 1 will come to rest with its surface in parallel relation to the back wall 8 of the front seat of the automobile.

In the event that it is found necessary to clean fabric 2, bag 3 can be removed from frame 1 by unfastening members 5 and by also unbuckling or removing both pairs of straps 11 and 12 from frame 1. Bag 3 can be pulled, then, clear of frame 1.

Having thus described my invention what I claim as new and desire to secure by Letters Patent is:

1. In a crib for automobiles, a frame, a removable fabric attached to said frame, glove fastener buttons for holding said fabric to said frame, straps fastened to said frame, hooks having open ends, whereby to hold the frame in suspended manner, said straps secured to said frame and engaging said hooks, whereby to attach said frame to said hooks, one of said hooks having a tooth adapted to engage one of said straps, whereby to aid in holding the frame in horizontal position and means attached to said fabric to aid in holding the frame in vertical position.

2. In a crib for automobiles, a frame, a removable fabric for covering said frame, glove fastener buttons for holding said fabric to said frame, straps fastened to said frame, hooks having triangular shaped openings and adapted to be removably mounted to the wall of the automobile seat, said straps adapted to pass through said triangular shaped openings, whereby to hold said frame in suspended position, one of said hooks having a tooth adapted to engage a strap, whereby to aid in holding the frame in horizontal position, and tags having glove fastener buttons attached to said removable fabric to aid in holding the frame in vertical position.

In testimony whereof I have affixed my signature.

IKE W. RIBYAT.